Patented Mar. 21, 1933

1,902,785

UNITED STATES PATENT OFFICE

OTTO LINSERT, OF WUPPERTAL-ELBERFELD, GERMANY, ASSIGNOR TO WINTHROP CHEMICAL COMPANY, INC., OF NEW YORK, N. Y., A CORPORATION OF NEW YORK

CRYSTALLINE ANTIRACHITICALLY ACTIVE PRODUCT AND A PROCESS OF PREPARING THE SAME

No Drawing. Application filed July 26, 1932, Serial No. 624,899, and in Germany September 18, 1931.

The present invention relates to a new crystalline antirachitically active product and to a process of preparing the same.

It is known that by special methods antirachitically active crystalline products can be isolated from the mixture produced by irradiating ergosterol with the rays from the ultraviolet part of the light. For example, A. Windaus (Proc. Royal Soc., London, B vol. 108 (1931) page 572) has described such a crystalline transformation product of ergosterol melting at 122° to 123° C., the limiting antirachitic dose being at $0.03\gamma$ ($1\gamma=0.001$ mg). In order to obtain the crystalline product, A. Windaus subjected the mixture, produced by irradiating ergosterol with ultraviolet light and freed from the unchanged parent ergosterol, to the action of maleic or citraconic acid anhydride. Addition compounds formed with the said reagents in the mixture were removed and the remainder crystallized after evaporating the solvent. On crystallization crystals of the above indicated properties were obtained.

In accordance with my present invention a new crystalline antirachitically highly active transformation product is obtained which distinctly differs from the crystalline antirachitically active products described by A. Windaus in the above mentioned publication and in his application Ser. No. 546,662, filed June 24, 1931, and by other authors and is believed to be the real antirachitically active ingredient in all the antirachitically active products prepared by irradiating ergosterol with ultraviolet light. The new crystalline product is prepared by utilizing A. Windaus's general method of removing inactive constituents of the irradiated ergosterol by condensing them with anhydrides of unstaturated aliphatic acids. My new crystalline product is the result of a particular combination of process steps, which combination is characterized by using as a starting material a transformation product of ergosterol, produced by irradiation with the unfiltered light of a magnesium spark, on the one hand and by using citraconic anhydride as the condensing agent, on the other hand.

In accordance with my invention I use preferably such magnesium spark irradiation products wherein the parent ergosterol has not been completely decomposed by the irradiation process, say mixtures wherein up to about 80% of the parent ergosterol has been decomposed by the irradiation process. For example, I use a product prepared by irradiating a benzene solution of ergosterol with the unfiltered light of a magnesium spark up to about an 80% decomposition of the ergosterol and evaporating the solvent. Such an irradiation product is at first freed from unchanged ergosterol in the manner known in the art, for example, by cooling its alcoholic solution to a temperature below 0° C., whereby the unchanged ergosterol separates, or by the known precipitation of ergosterol by means of digitonin. After separating the ergosterol or its digitonide, the solution is evaporated in a vacuo. The resulting mixture is then dissolved in an organic solvent which is inert to the reacting components, such as benzene, ether which may be mixed with petroleum ether, acetic acid ester and cyclohexane, and is subjected to the action of citraconic acid anhydride at room temperature, that is, at about 15° to about 25° C., for a prolonged period of time (say for about 5 to 10 days). At least one mol of citraconic acid anhydride is used for one mol of the irradiation product. For example, when using 1½ mol of citraconic acid anhydride on one mol of the irradiation products about 30% of the ergosterol decomposed by irradiation have reacted with the citraconic acid anhydride after about six days. Thereafter the antirachitically active part is separated from the addition compounds formed between the citraconic acid anhydride and the antirachitically inactive constituents of the irradiation mixture by subjecting the reaction mixture advantageously after evaporating the solvent to saponification by means of a caustic alkali such as potassium or sodium hydroxide or alcoholate. For example, after standing for about 12 hours at 20° C. in an alcoholic solution of caustic potash, the saponification mixture is diluted with water and the active ingredient which has not reacted with the citraconic acid anhydride is extracted by means of a volatile water-insoluble organic solvent usual for such extraction processes such as for example, ether, benzene, petroleum ether, and the like. Advantageously after drying, for example, by means of calcinated sodium sulfate, the extract obtained is carefully freed of the solvent and the remainder is transformed into the crystalline product by crystallization from a small quantity of a suitable organic solvent, such as ether, alcohols, a mixture of equal parts of ether and petroleum ether and the like. Preferably I use a quantity of acetone which is about equal to the quantity of the remainder. The solution is kept at a temperature of about 5° C. The crystallization which begins after some time is completed by cooling the solution to −20° C. The crystals are filtered by means of an ice-cooled suction filter and the adherent mother-lye is removed by washing with cooled methyl alcohol. For further purification the crystals are recrystallized from acetone or alcohol. Further quantities of crystals may be obtained from the mother-lyes by keeping them for a longer time at a temperature, below 0° C. Sometimes a repeated treatment of the mother-lyes with citraconic acid anhydride and further treatment as above indicated is advisable. The yield of crystals amounts to about 30% of that quantity of ergosterol which has been decomposed by the irradiation. It is advisable to exclude oxygen during all operations.

Instead of separating the unchanged parent ergosterol from the irradiation product prior to the treatment with citraconic acid anhydride as described in the example, one may separate the unchanged ergosterol also subsequently from the crystallizing final product.

The new crystalline antirachitically highly active transformation product of ergosterol thus obtainable melts at 116° to 117° C. It has a specific rotation of $$[\alpha]_D^{20} = +81.5°$$

in acetone solution, whereas Windaus's crystalline product referred to above has a specific rotation $$[\alpha]_D^{18} = +138°$$

in acetone solution. The absorption spectrum of the solution of my new crystalline product has a pronounced maximum at 265µµ similar to the absorption spectrum of the crystalline irradiation product of the melting point of 122° to 123° C. isolated by Windaus. However, the absorption coefficient at 265µµ of my new product is larger than that of Windaus's product. The crystals are insoluble in water, but generally soluble in organic solvents, for example, alcohols, ether, petroleum ether, benzene, xylene, nitrobenzene, cyclohexane, cyclohexanol, chloroform, carbon tetrachloride, acetic acid, acetic acid ester, pyridine, quinoline, and so on. The crystals cause, when mixed with the crystalline irradiation product of ergosterol of the melting point of 122° to 123° C., isolated by Windaus and referred to above, a distinct melting point lowering; for example, a finely divided mixture of about 8 parts of applicant's new product of the melting point of 116° to 117° C. and of 2 parts of Windaus's product of the melting point of 122° to 123° C. melts from 108° to 112° C. The antirachitic activity of the new crystalline irradiation product of ergosterol is the highest known up to this time.

The isolation of the real active ingredient of the antirachitically active irradiation product of ergosterol is a problem of great scientific and technical importance. Applicant believes that by his contribution to the said problem this ingredient has been prepared for the first time in a chemically pure and uniform condition, and, hence, free from other inactive substances accompanying it in the original antirachitically active mixture produced by ultraviolet irradiation of ergosterol.

I claim:—

1. The process which comprises freeing an antirachitically active product, prepared by irradiating ergosterol with the unfiltered light of a magnesium spark from the unchanged ergosterol contained therein, subjecting the product obtained to the action of at least one mol of citraconic acid anhydride over a period of several days at noon temperature in the presence of an organic solvent which is inert to the reacting components, saponifying the reaction mixture by the addition of a caustic alkali, then diluting the mixture with water, extracting the mixture obtained with an organic solvent, evaporating the solvent and transforming the remainder into crystals by fractional recrystallization from an organic solvent.

2. The process which comprises freeing an antirachitically active product, prepared by irradiating ergosterol with the unfiltered light of a magnesium spark, until up to 80% of the ergosterol has been decomposed by the irradiation, from the unchanged ergosterol contained therein, subjecting the product obtained to the action of at least one mol of citraconic acid anhydride over a period of several days at room temperature in the presence of an organic solvent which is inert to the reacting components, saponifying the reaction mixture by the addition of a caustic alkali, then diluting the mixture with water, extracting the mixture obtained with an organic solvent, evaporating the solvent and transforming the remainder into crystals by fractional recrystallization from an organic solvent.

3. The process which comprises freeing an antirachitically active product, prepared by irradiating ergosterol with the unfiltered light of a magnesium spark, until about 80% of the ergosterol has been decomposed by the irradiation, from the unchanged ergosterol contained therein, subjecting the product obtained to the action of about 1½ mols of citraconic acid anhydride during about 6 days at a temperature of 15 to about 20° C. in benzene solution, evaporating the solvent in vacuo, treating the residue with alcoholic caustic potash solution during about 12 hours at a temperature of 15 to about 20° C., then diluting the mixture with water and extracting with petroleum ether, drying the extract, evaporating the petroleum ether from the solution and recrystallizing the remainder by dissolving it in a small quantity of acetone, always taking care that oxygen be excluded as much as possible.

4. The crystalline antirachitically highly active transformation product of ergosterol, melting at 116° to 117° C., having a specific rotation $$[a]_D^{20} = +81.5°$$

in acetone solution, having an absorption spectrum with a pronounced maximum at 265$\mu\mu$, being insoluble in water, generally soluble in organic solvents, causing a distinct melting point lowering when mixed with the known crystalline antirachitically active irradiation product of ergosterol of the melting point of 122° to 123° C.

In testimony whereof, I affix my signature.

OTTO LINSERT.